US012215298B2

(12) United States Patent
Mehra et al.

(10) Patent No.: US 12,215,298 B2
(45) Date of Patent: Feb. 4, 2025

(54) SINGLE CHAMBER WATER-SOLUBLE REFILL DOSE ARTICLE ENCLOSING A CONCENTRATED CLEANSER COMPOSITION AND KITS HAVING SAME

(71) Applicants: Curan Mehra, New York, NY (US); HAYDEN PRODUCTS LLC, New York, NY (US)

(72) Inventors: Curan Mehra, New York, NY (US); Konstantinos Lahanas, Paramus, NJ (US)

(73) Assignee: HAYDEN PRODUCTS LLC, New York, NY (US)

( * ) Notice: Subject to any disclaimer, the term of this patent is extended or adjusted under 35 U.S.C. 154(b) by 230 days.

(21) Appl. No.: 17/668,635

(22) Filed: Feb. 10, 2022

(65) Prior Publication Data

US 2022/0220424 A1 Jul. 14, 2022

Related U.S. Application Data

(62) Division of application No. 17/168,942, filed on Feb. 5, 2021, now Pat. No. 11,268,054.

(60) Provisional application No. 63/136,033, filed on Jan. 11, 2021.

(51) Int. Cl.

| | |
|---|---|
| ***C11D 1/83*** | (2006.01) |
| ***C11D 1/29*** | (2006.01) |
| ***C11D 1/72*** | (2006.01) |
| ***C11D 3/37*** | (2006.01) |
| ***C11D 11/00*** | (2006.01) |
| ***C11D 17/04*** | (2006.01) |

(52) U.S. Cl.
CPC .............. *C11D 17/043* (2013.01); *C11D 1/29* (2013.01); *C11D 1/72* (2013.01); *C11D 3/3707* (2013.01); *C11D 3/3715* (2013.01); *C11D 11/0094* (2013.01)

(58) Field of Classification Search
CPC ........... C11D 1/83; C11D 1/667; C11D 1/002; C11D 3/30; C11D 7/3218; C11D 11/0023; C11D 17/042; C11D 17/043
See application file for complete search history.

(56) References Cited

U.S. PATENT DOCUMENTS

| | | | |
|---|---|---|---|
| 5,224,601 | A | 7/1993 | Gouge et al. |
| 6,840,408 | B1 | 1/2005 | Foster et al. |
| 6,923,346 | B2 | 8/2005 | Foster et al. |
| 7,013,623 | B2 | 3/2006 | Fisher et al. |
| 7,625,856 | B2 | 12/2009 | Burt et al. |
| 8,105,994 | B2 | 1/2012 | Tsaur et al. |
| 8,113,729 | B2 | 2/2012 | Solan |
| 8,236,747 | B2 | 8/2012 | Holzhauer et al. |
| D702,130 | S | 4/2014 | Handy |
| 8,992,632 | B2 | 3/2015 | Holzhauer |
| 9,237,831 | B1 | 1/2016 | Luu et al. |
| 10,047,327 | B2 | 8/2018 | Keuleers et al. |
| 10,066,195 | B2 | 9/2018 | Keuleers et al. |
| 10,144,908 | B2 | 12/2018 | Chandar et al. |
| 2001/0049345 | A1 | 12/2001 | Mumoli |
| 2003/0077005 | A1 | 4/2003 | Fisher et al. |
| 2003/0161796 | A1 | 8/2003 | Bracken et al. |
| 2004/0115137 | A1 | 6/2004 | Verrall et al. |
| 2004/0229763 | A1 | 11/2004 | Hutton et al. |
| 2005/0205574 | A1 | 9/2005 | Lambotte |
| 2007/0158367 | A1 | 7/2007 | Lin |
| 2008/0051314 | A1 | 2/2008 | Wenzel et al. |
| 2009/0176683 | A1 | 7/2009 | Choe et al. |
| 2010/0093581 | A1 | 4/2010 | Winston et al. |
| 2011/0123608 | A1 | 5/2011 | McAllister et al. |
| 2011/0278194 | A1 | 11/2011 | Zhu |
| 2011/0288000 | A1 | 11/2011 | Crawford et al. |
| 2012/0034314 | A1 | 2/2012 | Levison et al. |
| 2013/0277211 | A1 | 10/2013 | Joshi et al. |
| 2013/0313154 | A1 | 11/2013 | Hernandez et al. |
| 2014/0124535 | A1 | 5/2014 | Kelly et al. |
| 2014/0296124 | A1 | 10/2014 | Hulskotter et al. |
| 2016/0024447 | A1 | 1/2016 | Simonsen et al. |
| 2016/0067155 | A1 | 3/2016 | Shimada et al. |

(Continued)

FOREIGN PATENT DOCUMENTS

| | | |
|---|---|---|
| EP | 556957 | 8/1993 |

OTHER PUBLICATIONS https ://brandless.com/ products/refillable-tub-tile-cleaner-summer-breeze.
International Search Report and Written Opinion dated Apr. 23, 2021 in PCT/US21/17629.
International Search Report and Written Opinion dated Jun. 8, 2021 in PCT/US21/17636.

(Continued)

*Primary Examiner* — Charles I Boyer

(57) ABSTRACT

Single compartment water-soluble refill dose articles having a water-soluble film enclosing a liquid concentrated cleanser composition, methods of making the same, and kits are disclosed. The liquid concentrated cleanser composition includes a mixture of a rheology modifier, a first surfactant, a stabilizing amount of a first alkaline substance, a viscosity increasing amount of an additional alkaline substance that interacts with the rheology modifier, when diluted with water to form a cleanser, to increase the viscosity, and about 10% or less wt/wt water and about 20% or less by wt/wt glycol. The first alkaline substance is an ethoxylated amine and prevents the viscosity increasing amount of additional alkaline substance from reacting with the rheology modifier before water dissolves the water-soluble film. When dissolved in water at a 1:1 to 1:20 ratio, a cleanser has a viscosity within a range of 2000 cps to 50,000 cps is formed.

19 Claims, 1 Drawing Sheet

(56) References Cited

U.S. PATENT DOCUMENTS

| | | | | |
|---|---|---|---|---|
| 2016/0068620 | A1 | 3/2016 | Tamareselvy et al. | |
| 2016/0075478 | A1 | 3/2016 | Godsey et al. | |
| 2016/0158776 | A1 | 6/2016 | Sternberg et al. | |
| 2016/0303043 | A1 | 10/2016 | Khoury | |
| 2016/0355755 | A1 | 12/2016 | Brooker et al. | |
| 2017/0183609 | A1 | 6/2017 | Hulskotter et al. | |
| 2017/0226447 | A1 | 8/2017 | Keuleers et al. | |
| 2018/0037858 | A1 | 2/2018 | Keuleers et al. | |
| 2019/0093054 | A1 | 3/2019 | Patterson et al. | |
| 2019/0239506 | A1 | 8/2019 | Macinga et al. | |
| 2020/0199497 | A1 | 6/2020 | Piorkowski et al. | |
| 2021/0038494 | A1* | 2/2021 | Qu .......................... | C11D 1/88 |
| 2021/0128415 | A1 | 5/2021 | Stern et al. | |
| 2021/0154120 | A1* | 5/2021 | Kadir ...................... | A61Q 5/12 |
| 2021/0169750 | A1 | 6/2021 | Maka et al. | |
| 2021/0230519 | A1 | 7/2021 | Watson et al. | |
| 2021/0246396 | A1 | 8/2021 | Mehra et al. | |

OTHER PUBLICATIONS

World's Cleanest Soap—Eco Friendly Refillable Hand Soap + 10 Eco Soap Pods—Mortier Pilon, https://www.mmtumshop.com/collections/mortier-pilon/products/sustainable-hand-soap-glass-bottle-10-orange-soap-refills, first accessed Apr. 12, 2020 (9 pages).

International Search Report and Written Opinion dated Apr. 5, 2022 in PCT/US21/59945.

* cited by examiner

SINGLE CHAMBER WATER-SOLUBLE REFILL DOSE ARTICLE ENCLOSING A CONCENTRATED CLEANSER COMPOSITION AND KITS HAVING SAME

The present application is a continuation of U.S. Ser. No. 17/168,942, filed Feb. 5, 2021; which claims the benefit of U.S. Provisional Application 63/136,033, filed Jan. 11, 2021; which are hereby incorporated by reference in their entirety.

TECHNICAL FIELD

This application relates to a water-soluble refill dose articles for a cleanser, more particularly, to a water-soluble refill dose article for a liquid cleanser dispenser.

BACKGROUND

Liquid cleansers, such as hand soaps, body wash, etc., such as those in a filled hand soap dispenser, bottle, or jug with a large quantity of soap for refilling such dispensers have a large concentration of water, which contributes to the overall weight of the product. The weight of the product and size of the dispenser or container adds to the manufacturing, packaging costs, and shipping costs. Since clean water is available readily in most of the world, and packaging can be re-used, it is wasteful to ship water in the liquid cleansers from one location to another and to use the original packages only once.

Liquid cleanser dispensers are useful in dispensing an appropriate amount of cleanser to a user for proper hygiene, including preventing the transmission of bacteria, viruses, etc. But refilling such dispensers can be difficult because of the heaviness of a bottle or jug of cleanser, which makes it difficult to hold and pour to fill the dispenser. It can also be messy, since dispensers typically have fairly small mouth openings.

Liquid cleansers have a viscosity that is generally thicker than other cleansers and as a result has an acceptable feel (lubricity) to the user when applied to their skin and enables suspension of different beneficial materials or additives. Typically, adding water to a concentrate results in a diluted, thinner, i.e., reduced viscosity, solution. It is a challenge to develop a concentrated cleanser in a delivery vehicle that upon dilution with water, is easily soluble in water, achieves a viscosity acceptable for such cleansers, and further still foams as expected by the user.

As disclosed in U.S. Provisional Application No. 62/975,523, keeping the rheology modifier separated from an alkaline substance that activates the rheology modifier to prevent premature activation thereof in a concentrated soap formulation was necessary. In fact, the rheology modifier and alkaline substance formed an insoluble solid in the concentrated cleanser formulation if together in a single concentrated cleanser formulation. As such, a dual chambered water-soluble refill dose article was disclosed in the co-pending application. A single chambered water-soluble refill dose article is desirable because single chambered articles are generally easier to manufacture.

There is a need for a concentrated form of a cleanser that can be dissolved in water to form a suitable liquid cleanser having a stable formulation with a rheology modifier and a substance that activates the rheology modifier present together without premature activation of the rheology modifier for a single chambered water-soluble refill dose article that also has desirable viscosity and foamability.

SUMMARY

In all aspects, single compartment water-soluble refill dose articles for forming a cleanser are disclosed that have a water-soluble film enclosing a liquid concentrated cleanser composition. The liquid concentrated cleanser composition includes a mixture of a rheology modifier, a first surfactant, a stabilizing amount of a first alkaline substance, a viscosity increasing amount of additional alkaline substance that interacts with the rheology modifier, when diluted with water to form a cleanser, to increase the viscosity of the cleanser, and has about 10% or less wt/wt water and about 20% or less by wt/wt glycol. The first alkaline substance is an ethoxylated amine. When dissolved in water at a 1:1 to 1:20 ratio, the resulting cleanser is one with a viscosity within a range of 2000 cps to 50,000 cps is formed.

In all embodiments, the rheology modifier is selected from the group consisting of swellable acrylate polymers, superabsorbent polymers, cellulosic polymers, and combinations thereof and is present as 2% wt/wt to 10% wt/wt of the concentrated cleanser composition. In one embodiment, the rheology modifier includes a self-wetting polymer, for example acrylate/C10-C30 alkyl acrylate crosspolymer. In one embodiment, the rheology modifier is a mixture of acrylate/C10-C30 alkyl acrylate crosspolymer and a carbohydrate gum.

The first surfactant is present in an amount effective to wet the rheology modifier, which may be as 10% wt/wt to 99% wt/wt of the concentrated cleanser composition. The first surfactant comprises one or more of sodium laureth-5 carboxylic acid, sodium lauroyl lactylate, sodium C 14-18 olefin sulfonate, sodium lauroyl methyl isethionate, disodium coco-glucoside citrate, sodium lauroyl sarcosinate, sodium cocoyl glutamate and potassium olivoyl hydrolyzed oat protein. The composition can include a second surfactant, which is an amphoteric surfactant and/or a nonionic surfactant. The second surfactant can be one or more of polysorbate 20, polyglyceryl-2 caprate and polyglyceryl-3 lactate/laurate. One of the first surfactant and the second surfactant is a foaming surfactant for foaming action of the final cleanser product at a level that is desired by the consumer.

In all aspects, the viscosity increasing amount of the additional alkaline substance is either more of the first alkaline substance or is a second alkaline substance that is different than the first alkaline substance. In one embodiment, the first alkaline substance comprises polyethylene glycol-15 cocamine and the additional alkaline substance is more of the first alkaline substance. The concentration of the first alkaline substance is at least equivalent to the concentration of the rheology modifier. In another embodiment, the first alkaline substance comprises polyethylene glycol-15 cocamine, and the second alkaline substance is an amido amine or a di- or tri-amine; potassium hydroxide, sodium hydroxide, or ammonium hydroxide; an amine having less than 8 carbons, an amido-amine, and combinations thereof.

In all aspects, the concentrated cleanser composition can include a preservative in a total effective amount for the cleanser volume, and/or one or more additives selected from the group consisting of coloring, fragrance, emollients, and emulsifiers.

In another aspect, cleanser kits are disclosed that have a dispenser that discharges a liquid cleanser upon activation by a user and a water-soluble refill dose article. The dispenser has a container defining a preselected cleanser volume and a pump removably and sealably engaging a mouth of the container. The pump may be hand-activated or sensor/automatically activated. The water-soluble refill dose article is as described above. The kit may have a water-soluble refill dose article disposed inside the dispenser and/or a plurality of the water-soluble refill dose articles packaged to accompany the dispenser. As such, the water-soluble refill dose article is sized and shaped to be smaller than the mouth of the container.

In another aspect, methods of making the liquid concentrated cleanser for the single compartment water-soluble refill dose articles are disclosed. The concentrated cleanser composition can made by either melting an anhydrous surfactant by application of heat or mixing the anhydrous surfactant with at least one other liquid ingredient, mixing into the surfactant a rheology modifier and a first alkaline substance, sequentially in either order to form an intermediate mixture, and mixing remaining ingredients into the intermediate mixture to form a concentrated cleanser composition that when diluted with water to form a cleanser will result in a cleanser with a viscosity within a range of 2000 cps to 50,000 cps. The remaining ingredient includes one or more of additional surfactant, preservative, fragrance, benefit agent, and colorant.

In one embodiment, the first alkaline substance comprises collectively a stabilizing amount and a viscosity increasing amount thereof, and the mixing sequentially includes mixing the first alkaline substance before mixing the rheology modifier.

In another embodiment, mixing sequentially includes mixing the rheology modifier before mixing the first alkaline substance. Here, the first alkaline substance is present in a stabilizing amount and a second alkaline substance is present that is different from the first alkaline substance. The second alkaline substance is added with mixing, subsequent to mixing in the first alkaline substance, and is present as a viscosity increasing amount.

In all aspects, an aliquot of any one or more of the surfactants can be reserved and mixed with any of the remaining ingredients to help mix the same into the composition. In one embodiment, the method can include reserving of an aliquot of the first surfactant and mixing a colorant or additive therewith to form a reserved mixture and mixing the reserved mixture with the stabilized mixture before mixing in the viscosity increasing amount of the additional alkaline sub stance.

The viscosity increasing amount of additional alkaline substance interacts with the rheology modifier, when diluted with water to form a cleanser, to increase the viscosity of the cleanser to a viscosity within a range of 2000 cps to 50,000 cps. The viscosity increasing amount of the additional alkaline substance is either of the first alkaline substance or of a second alkaline substance that is different than the first alkaline substance. The concentration of the first alkaline substance is at least equivalent to the concentration of the rheology modifier.

In one embodiment, the first alkaline substance comprises polyethylene glycol-15 cocamine. In another embodiment, the first alkaline substance comprises polyethylene glycol-15 cocamine, and the second alkaline substance is an amido amine or a di- or tri-amine.

DETAILED DESCRIPTION

Figure 1:
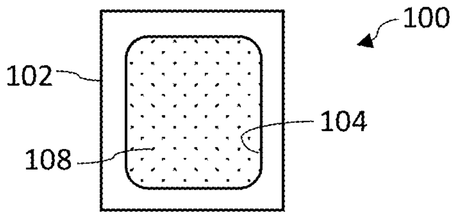
FIG. 1 is a top plan view of one embodiment of a water-soluble refill dose article that forms a cleanser upon dilution in water.

The following detailed description will illustrate the general principles of the invention, examples of which are additionally illustrated in the accompanying drawings. In the drawings, like reference numbers indicate identical or functionally similar elements.

Except in the working examples, or where otherwise explicitly indicated, all numbers in this description indicating amounts, parts, percentages, ratios, and proportions of material, physical properties of material, and conditions of reaction are to be understood as modified by the word "about." "About" as used herein means that a value is preferably +/−5% or more preferably +/−2%.

As used herein "refill dose" means an amount of cleanser that is more than a single use volume. Typically, the refill dose defines a cleanser volume that includes a plurality of single use doses and may even form a refill cleanser volume that can fill multiple smaller sized dispensers.

All parts, percentages, ratios, and proportions of material referred to in this description are by weight unless otherwise indicated. It should also be noted that in specifying any range of concentration or amount, any particular upper concentration or amount can be associated with any particular lower concentration or amount.

FIG. 1 illustrates an embodiment of a water-soluble refill dose article 100 that forms a liquid cleanser upon dilution with water. The liquid cleanser may be a hand soap, body wash, shampoo, makeup remover, facial cleanser, dish soap, and the like. The water-soluble refill dose article 100 is made of a water-soluble film 102 defining a single compartment 104 enclosing a concentrated cleanser composition 108. The concentrated cleanser composition 108 is a liquid and comprises a rheology modifier, a first surfactant that does not interact with the rheology modifier, a stabilizing amount of a first alkaline substance, and a viscosity increasing amount of an additional alkaline substance that interacts with the rheology modifier, when eater water is added to form a cleanser, to increase the viscosity of the cleanser. The first alkaline substance is preferably an ethoxylated amine and prevents the additional alkaline substance from reacting with the rheology modifier before water dissolves the water-soluble film. The concentrated cleanser composition 108 has water and a glycol present and has about 10% or less by weight water and about 20% or less by weight glycol. Glycol as used herein means ethylene glycol, polyethylene glycol, derivatives thereof, and combinations thereof.

The water-soluble refill single dose article 100 is combined with water at a 1:1 to 1:20 (refill dose article:water) ratio to produce a cleanser volume that has a viscosity within a range of 2000 cps to 50,000 cps, 5000 cps to 25,000 cps, or more preferably 10000 cps to 20,000 cps. The refill dose article:water ratio is more preferably a 1:5 to 1:15 ratio, and even more preferably a 1:10 ratio. When diluted in water in a dispenser for a cleanser, such as a hand cleanser or body wash, the cleanser volume can be in a range of 50 ml to 18.9 L (5 gal), 100 ml to 7.6 L (2 gal), 100 mL to 1 L, 200 ml to 500 ml.

Referring again to FIG. 1, the water-soluble refill dose article comprises at least one water-soluble film shaped such that the refill dose article comprises one internal compartment surrounded by the water-soluble film. The internal compartment holds on containment a cleanser composition. The water-soluble film is sealed such that the concentrated cleanser composition does not leak out of its compartment during storage. However, upon addition of the water-soluble refill dose article to water, the water-soluble film dissolves and releases the contents of the internal compartment into the water. A compartment should be understood as meaning a separate closed internal space defined by the water-soluble film, which encloses or encapsulates therein, in isolation, said composition.

The article may comprise two films. A first film may be shaped to comprise an open compartment into which the concentrated cleanser composition is added. A second film is then laid over the first film in such an orientation as to close the opening of the compartment. The first and second films are then sealed together along a seal region. Suitable water-soluble films are described in more detail in U.S. Pat. Nos. 7,013,623 and 10,047,327, both of which are incorporated herein in their entirety.

The Concentrated Cleanser Composition

The concentrated cleanser composition comprises a rheology modifier selected from the group consisting of swellable acrylate polymers, superabsorbent polymers, cellulosic polymers, and combinations thereof. Such polymers can be cationic, anionic, amphoteric or nonionic and are preferably a self-wetting polymer. They increase the viscosity and stability of liquid formulations. The amount of the rheology modifier in the concentrated cleanser composition ranges from 1% by wt to 10% by wt thereof, 2% by wt to 7% by wt thereof, or more preferably 3% by wt to 6% by wt of the concentrated cleanser composition.

Example rheology modifiers include the carbohydrate gums such as cellulose gum, microcrystalline cellulose, cellulose gel, hydroxyethyl cellulose, hydroxypropyl cellulose, hydroxypropyl methylcellulose, sodium carboxymethylcellulose, methyl cellulose, ethyl cellulose, guar gum, gum karaya, gum tragacanth, gum arabic, gum acacia, gum agar, xanthan gum and mixtures thereof swellable acrylate polymers such as ACULYN® 28 (acrylates/beheneth-25 methacrylate copolymer), ACULYN® 22 (acrylates/steareth-20 methacrylate copolymer) or CARBOPOL® Ultrez 20 (an acrylate/$C_{10}$-$C_{30}$ alkyl acrylate crosspolymer); cationic polymers such as modified polysaccharides including cationic guar available from Solvay under the trade name JAGUAR® C13S, JAGUAR® C14S, JAGUAR® C17, or J JAGUAR® C16; cationic modified cellulose such as UCARE™ Polymer JR 30 or JR 40 from Dow Inc.; synthetic cationic polymer such as MERQUAT® 100, MERQUAT® 280, MERQUAT® 281 and MERQUAT® 550 sold by Lubrizol. Also suitable are high molecular weight polyethylene glycols such as POLYOX® WSR-205 (PEG 14M), POLYOX® WSR-N-60K (PEG 45), and POLYOX® WSR-301 (PEG 90M) from Dow Inc. Example superabsorbent polymers include, but are not limited to, AQUA KEEP™ super absorbent polymer manufactured by Sumitomoseika Chemical Co., sodium polyacrylate, and dehydroxanthan gum.

Typically, the rheology modifier is an acid that is neutralized by a base to form a salt which swells and thickens the composition. In one embodiment, the rheology modifier is a self-wetting polymer such as acrylate/C10-C30 alkyl acrylate crosspolymer and is present as 1% to 10% by weight of the concentrated cleanser composition, more preferably 1% to 7% by weight, or 1% to 6% by weight of the concentrated cleanser composition. This crosspolymer is sold under the brand Carbopol® by Lubrizol. This polymer is difficult to work with as it collapses easily and can thicken prematurely.

Surfactants

Surfactants, one or more thereof, can be present in the concentrated cleanser composition. The surfactants are preferably ones that will not activate the thickening of the composition, i.e., will wet the rheology modifier without interacting with it chemically. The first surfactant may be one or more of an anionic surfactant, a nonionic surfactant, and an amphoteric surfactant, but preferably includes at least one foaming surfactant. A foaming surfactant is a surfactant that has as initial foam volume of greater than 10 cm per the Ross-Miles Foam Test (ASTM D1173-53).

Examples of anionic surfactants suitable for use herein include, but are not limited to, ammonium lauryl sulfate, ammonium laureth sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric monoglyceride sodium sulfate, sodium lauryl sulfate, sodium laureth sulfate, potassium laureth sulfate, sodium lauryl sarcosinate, sodium lauroyl sarcosinate, potassium lauryl sulfate, sodium trideceth sulfate, sodium methyl lauroyl taurate, sodium lauroyl isethionate or methyl isethionate, sodium lauroyl lactylate, sodium laureth sulfosuccinate, sodium lauroyl sulfosuccinate, sodium tridecyl benzene sulfonate, sodium dodecyl benzene sulfonate, sodium lauryl amphoacetate, sodium olefin sulfonate, sodium decyl sulfate, olivoil avenate, disodium coco-glucoside citrate, ammonium ether sulfate, laureth-5 carboxylic acid, potassium olivoyl hydrolyzed oat protein, and mixtures thereof. The anionic surfactant may be, for example, an aliphatic sulfonate, such as a primary $C_8$-$C_{22}$ alkane sulfonate, primary $C_8$-$C_{22}$ alkane disulfonate, $C_8$-$C_{22}$ alkene sulfonate, $C_8$-$C_{22}$ hydroxyalkane sulfonate or alkyl glyceryl ether sulfonate. $C_8$-$C_{22}$ is a range for the length of the carbon chain, including any narrower ranges therein having a minimum and maximum selected from any of $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, and $C_{22}$.

Example nonionic surfactants include, but are not limited to, ethylene maleic anhydride (EMA), sorbitan stearate (e.g., SPAN® 60), sorbitan monooleate (e.g., SPAN® 80), polyethylene glycol sorbitan monooleate (TWEEN® 80), polysorbate (TWEEN® 20), polyvinyl alcohol, ethylene oxide/propylene oxide block copolymers (e.g., PLURONIC® P105), polyoxyethylene (5) nonylphenylether, branched (IGEPAL® CO-520), alcohol ethoxylate, linear alcohol (C9-11) ethoxylate, decyl alcohol ethoxylate, sodium cocoyl glutamate, polyglyceryl-2-caprate, polyglyceryl-3 lactate/laurate, or a mixture thereof.

Amphoteric surfactants suitable for use herein include, but are not limited to derivatives of aliphatic quaternary ammonium, phosphonium, and sulfonium compounds, in which the aliphatic radicals can be straight or branched chain, and wherein one of the aliphatic substituents contains from about 8 to about 18 carbon atoms and one substituent contains an anionic group, e.g., carboxy, sulfonate, sulfate, phosphate, or phosphonate. Illustrative amphoteric surfactants are coco dimethyl carboxymethyl betaine, cocoamidopropyl betaine, cocobetaine, cocamidopropyl hydroxysultaine, oleyl betaine, cetyl dimethyl carboxymethyl betaine, lauryl bis-(2-hydroxyethyl)carboxymethyl betaine, stearyl bis-(2-hydroxypropyl)carboxymethyl betaine, oleyl dimethyl gamma-carboxypropyl betaine, lauryl bis-(2-hydroxypropyl)alpha-carboxyethyl betaine, and mixtures thereof. The sulfobetaines may include stearyl dimethyl sulfopropyl betaine, lauryl dimethyl sulfoethyl betaine, lauryl bis-(2-hydroxyethyl) sulfopropyl betaine and mixtures thereof.

The first surfactant can be any one or more of the surfactants discussed above with respect to the concentrated cleanser composition. In one embodiment, the first surfactant includes sodium lauroyl sarcosinate. In another embodiment, the first surfactant comprises a mixture of sodium lauroyl sarcosinate and one or more additional anionic surfactants and a nonionic surfactant, such as a mixture of one or more of sodium laureth sulfate, olivoil avenate, and polysorbate 20.

First Alkaline Substance

The polymeric rheology modifiers of the present invention are generally supplied in their acidic form. These polymers modify the rheology of a formulation through subsequent neutralization of the carboxyl groups of the polymer. This causes ionic repulsion and a three dimensional expansion of the microgel network thus resulting in an increase in viscosity and other rheological properties. This is also referred to in the literature as a "space filling" mechanism as compared to an associative thickening mechanism.

The first alkaline material is therefore incorporated to neutralize the polymer and is preferably a neutralizing agent. Many types of neutralizing agents can be used in the present invention, including inorganic and organic neutralizers. Examples of inorganic bases include but are not limited to the alkali hydroxides (especially sodium, potassium, and ammonium). Examples of organic bases include but are not limited to triethanolamine (TEA), arginine, aminomethyl propanol, tromethamine (2-amino 2-hydroxymethyl-1,3-propanediol), PEG-15 cocamine, diisopropanolamine, triisopropanolamine, or tetrahydroxypropyl ethylene diamine. Alternatively, other alkaline materials can be used, such as pre-neutralized surfactants or materials which incorporate a neutralizing agent therein or any other material capable of increasing the pH of the composition.

The first alkaline substance is present in a stabilizing amount. A "stabilizing amount" is a concentration sufficient to prevent a concentration of the first alkaline material from interacting with the rheology modifier in the concentrated cleanser composition. Without the stabilizing amount of the first alkaline substance, the rheology modifier and the first alkaline modifier, in concentrations within the disclosed ranges, forms an insoluble solid. In one embodiment, the first alkaline substance is present at a concentration of % wt/wt that is equivalent to the % wt/wt concentration of the rheology modifier and is greater than the concentration of the first alkaline substance. In all embodiments, the concentration of the first alkaline substance is typically in a range of about 3% wt/wt to about 30% wt/wt, more preferably about 5% wt/wt to about 23% wt/wt of the composition.

The first alkaline substance can also be the additional alkaline substance, which is present in a viscosity increasing amount. The viscosity increasing amount is a % wt/wt concentration that is an amount above and beyond the stabilizing amount of the first alkaline substance. These two concentrations can be added as separate aliquots, with the viscosity increasing amount being added subsequent to the stabilizing amount, such that an insoluble solid is not formed or they can be added as a single aliquot. The second aliquot of the first alkaline substance can be present as about 1% to about 10% by weight of the concentrated cleanser composition, more preferably about 2% to about 7% wt/wt.

Second Alkaline Substance

The additional alkaline substance, rather than being a second aliquot of the first alkaline substance, is a second alkaline substance that is different than the first alkaline substance. The second alkaline substance includes, for example, amine salts, quaternary ammonium compounds, amido-amines, di- or tri-amines, short chain amines having less than 8 carbons (for example arginine), hydroxides (such as sodium hydroxide, potassium hydroxide, and ammonium hydroxide), and combinations thereof. The second alkaline substance comprises about 1% to about 10% by weight of the concentrated cleanser composition, more preferably about 2% to about 7% wt/wt.

Suitable amine salts include, but are not limited to, ethoxylated tallow amine, cocoalkylamine, and oleylamine.

Suitable quaternary ammonium compounds include, but are not limited to, cetyl trimethyl ammonium bromide, myristyl trimethyl ammonium bromide, stearyl dimethyl benzyl ammonium chloride, lauryl/myristryl trimethyl ammonium methosulfate, stearyl octyldimonium methosulfate, dihydrogenated palmoylethyl hydroxyethylmonium methosulfate, isostearyl benzylimidonium chloride, cocoyl benzyl hydroxyethyl imidazolinium chloride, cocoyl hydroxyethylimidazolinium.

Suitable amido-amines include, but are not limited to, stearamidopropyldimethylamine, stearamidopropyldiethylamine, stearamidoethyldiethylamine, stearamidoethyldimethylamine, palmitamidopropyldimethylamine, palmitamidopropyldiethylamine, palmitamidoethyldiethylamine, palmitamidoethyldimethylamine, behenamidopropyldimethylamine, behenamidopropyldiethylmine, behenamidoethyldiethylamine, behenamidoethyldimethylamine, arachidamidopropyldimethylamine, arachidamidopropyldiethylamine, arachid-amidoethyldiethylamine, arachidamidoethyldimethylamine, and mixtures thereof. Commercially available amido-amines useful herein include: stearamidopropyldimethylamine with tradenames LEXAMINE S-13 available from Inolex (Philadelphia Pa., USA), behenamidopropyldimethylamine with a tradename INCROMINE BB available from Croda (North Humberside, England), and various amido-amines, preferably tertiary amido-amines, with tradenames SCHERCODINE series available from Lubrizol (Ohio, USA).

Suitable di- or tri-amines include, but are not limited thereto, triethanolamine and N,N,N',N'-Tetrakis(2-Hydroxypropyl)ethylenediamine, solutions of short chain amines.

Preservative

The concentrated cleanser composition can comprise a preservative in a total effective amount for the preselected cleanser volume. The "total effective amount" is the total amount of preservative in the one or more compartments that upon dilution with water to the preselected cleanser volume is present in a preservative effective amount to give the preselected cleanser volume a shelf-life suitable to industry standards. The total effective amount of the preservative is in a range of 1% by wt to 25% by wt and the amount of preservative in the preselected cleanser volume is in a range of 0.1% by weight to 2% by weight.

The preservatives protect the resulting cleanser against the growth of potentially harmful microorganisms. Suitable preservatives include, but are not limited to, alkyl esters of para-hydroxybenzoic acid, hydantoin derivatives, propionate salts, and a variety of quaternary ammonium compounds. Among the preservatives of particular interest are phenoxyethanol, methyl paraben, propyl paraben, imidazolidinyl urea, sodium dehydroacetate and benzyl alcohol.

Additives

The concentrated cleanser composition can comprise one or more additives. The additives may be selected from the group consisting of coloring, fragrance, skin and/or hair benefit agents, UV absorbers, and emulsifiers.

The term skin and/or hair benefit agent, collectively "benefit agents," for skin is typically a substance which softens or improves the elasticity, appearance, and youthfulness of the skin (stratum corneum) by either increasing its water content, adding, or replacing lipids and other skin nutrients, or both, and keeps it soft by retarding the decrease of its water content. For hair, the benefit agent is typically a substance that conditions, strengthens, repairs, smooths, reduces static, imparts style-retention properties, color, or provides another benefit to the hair. Included among the suitable benefit agents are emollients, including, for example, hydrophobic emollients, hydrophilic emollients, or blends thereof.

Useful benefit agents include the following: (a) silicone oils and modifications thereof such as linear and cyclic polydimethylsiloxanes; amino, alkyl, alkylaryl, and aryl silicone oils; (b) fats and oils including natural fats and oils such as jojoba, soybean, sunflower, rice bran, avocado, almond, olive, sesame, persic, castor, coconut, and mink oils; cacao fat; beef tallow and lard; hardened oils obtained by hydrogenating the aforementioned oils; and synthetic mono, di and triglycerides such as myristic acid glyceride and 2-ethylhexanoic acid glyceride; (c) waxes such as carnauba, spermaceti, beeswax, lanolin, and derivatives thereof; (d) hydrophobic and hydrophilic plant extracts; (e) hydrocarbons such as liquid paraffin, petrolatum, microcrystalline wax, ceresin, squalene, pristan and mineral oil; (f) higher fatty acids such as lauric, myristic, palmitic, stearic, behenic, oleic, linoleic, linolenic, lanolic, isostearic, arachidonic and poly unsaturated fatty acids (PUFA); (g) higher alcohols such as lauryl, cetyl, stearyl, oleyl, behenyl, cholesterol and 2-hexydecanol alcohol; (h) esters such as cetyl octanoate, myristyl lactate, cetyl lactate, isopropyl myristate, myristyl myristate, isopropyl palmitate, isopropyl adipate, butyl stearate, decyl oleate, cholesterol isostearate, glycerol monostearate, glycerol monolaurate, glycerol distearate, glycerol tristearate, alkyl lactate, alkyl citrate and alkyl tartrate; (i) essential oils and extracts thereof such as mentha, jasmine, camphor, white cedar, bitter orange peel, ryu, turpentine, cinnamon, bergamot, citrus unshiu, calamus, pine, lavender, bay, clove, hiba, eucalyptus, lemon, starflower, thyme, peppermint, rose, sage, sesame, ginger, basil, juniper, lemon grass, rosemary, rosewood, avocado, grape, grapeseed, myrrh, cucumber, watercress, calendula, elder flower, geranium, linden blossom, amaranth, seaweed, ginko, ginseng, carrot, guarana, tea tree, jojoba, comfrey, oatmeal, cocoa, neroli, vanilla, green tea, penny royal, aloe vera, shea oil, menthol, cineole, eugenol, citral, citronelle, borneol, linalool, geraniol, evening primrose, camphor, thymol, spirantol, penene, limonene and terpenoid oils; (j) polyhydric alcohols, for example, glycerine, sorbitol, propylene glycol, and the like; and polyols such as the polyethylene glycols, examples of which are: Polyox WSR-205 PEG 14M, Polyox WSR-N-60K PEG 45M, or Polyox WSR-N-750, and PEG 7M; (k) lipids such as cholesterol, ceramides, sucrose esters and pseudo-ceramides as described in European Patent Specification No. 556,957; (I) vitamins, minerals, and skin nutrients such as milk, vitamins A, E, and K; vitamin alkyl esters, including vitamin C alkyl esters; magnesium, calcium, copper, zinc and other metallic components; (m) sunscreens such as octyl methoxyl cinnamate (Parsol MCX) and butyl methoxy benzoylmethane (Parsol 1789); (n) phospholipids; and (o) anti-aging compounds such as alpha-hydroxy acids and beta-hydroxy acids.

Example hair benefit agents are found in US 2003/0161796, and example skin and hair benefit agents are found in U.S. Pat. No. 8,105,994. The examples from both patent references are incorporated herein by reference.

Benefit agents commonly account for up to 30% wt/wt of the preselected cleanser volume, with levels of from 0 to 25% wt/wt, more particularly from 0 to 20% wt/wt, being typical of the levels at which those skin benefit agents generally known as "emollients" are employed in many of the subject formulations. Preferred skin benefit agents include fatty acids, hydrocarbons, polyhydric alcohols, polyols and mixtures thereof, with emollients that include at least one $C_{12}$ to $C_{18}$ fatty acid, petrolatum, glycerol, sorbitol and/or propylene glycol.

Additional optional ingredients which may be present in the cleansing formulations are, for example: sequestering and chelating agents such as tetrasodium ethylenediaminetetraacetate (EDTA), ethane hydroxyl diphosphonate (EHDP), and etidronic acid, aka 1-hydroxyethylidene diphosphonic acid (HEDP); opacifiers and pearlizers such as zinc stearate, magnesium stearate, $TiO_2$, ethylene glycol monostearate (EGMS), ethylene glycol distearate (EGDS) or Lytron 621 (Styrene/Acrylate copolymer) and the like; pH adjusters; antioxidants, for example, butylated hydroxytoluene (BHT) and the like; stabilizers such as benzotriazolyl dodecyl p-cresol (a broadband UV absorber for stabilization of transparent packaged products); and other ingredients such as are conventionally used in liquid cleanser formulations. The total amount of such additional optional ingredients is typically from 0 to 10% wt/wt, more particularly from 0.1 to 5% wt/wt, based on the total weight of the cleanser volume.

Method of Making the Concentrated Cleanser Composition

The concentrated cleanser composition can made by either melting an anhydrous surfactant by application of heat or mixing the anhydrous surfactant with at least one other liquid ingredient, mixing sequentially into the surfactant a rheology modifier and a first alkaline substance, in either order to form an intermediate mixture, and mixing remaining ingredients into the intermediate mixture to form a concentrated cleanser composition that when diluted with water to form a cleanser will result in a cleanser with a viscosity within a range of 2000 cps to 50,000 cps. The remaining ingredient includes one or more of additional surfactant, preservative, fragrance, benefit agent, and colorant.

In one embodiment, the first alkaline substance comprises collectively a stabilizing amount and a viscosity increasing amount thereof, and the mixing sequentially includes mixing the first alkaline substance before mixing the rheology modifier.

In another embodiment, mixing sequentially includes mixing the rheology modifier before mixing the first alkaline substance. Here, the first alkaline substance is present in a stabilizing amount and a second alkaline substance is present that is different from the first alkaline substance. The second alkaline substance is added with mixing, subsequent to mixing in the first alkaline substance, and is present as a viscosity increasing amount.

In all aspects, an aliquot of any one or more of the surfactants can be reserved and mixed with any of the remaining ingredients to help mix the same into the composition. In one embodiment, the method can include reserving of an aliquot of the first surfactant and mixing a colorant or additive therewith to form a reserved mixture and mixing the reserved mixture with the stabilized mixture before mixing in the viscosity increasing amount of the additional alkaline sub stance.

In all aspects, the first alkaline substance comprises polyethylene glycol-15 cocamine. The concentration of the first alkaline substance is at least equivalent to the concentration of the rheology modifier.

Alternately, the concentrated cleanser composition can made by providing a surfactant mixture, which can include a preservative, fragrance, or other additives and mixing a rheology modifier into the surfactant mixture to form a secondary mixture. The method can include reserving an aliquot of the first surfactant or surfactant mixture and mixing a colorant or other additive(s) therewith to form a reserved mixture. Next, a stabilizing amount of a first alkaline substance is mixed into the secondary mixture to form a stabilized mixture. The reserved mixture, if present, is mixed with the stabilized mixture before mixing in a viscosity increasing amount of an additional alkaline substance. Lastly, the viscosity increasing amount of the additional alkaline substance is mixed into the stabilized mixture. The viscosity increasing amount of additional substance interacts with the rheology modifier, when diluted with water to form a cleanser, to increase the viscosity of the cleanser to a viscosity within a range of 2000 cps to 50,000 cps. The viscosity increasing amount of the additional alkaline substance is either of the first alkaline substance or of a second alkaline substance that is different than the first alkaline substance. The concentration of the first alkaline substance is at least equivalent to the concentration of the rheology modifier.

In one embodiment, the first alkaline substance comprises polyethylene glycol-15 cocamine. In another embodiment, the first alkaline substance comprises polyethylene glycol-15 cocamine, and the second alkaline substance is an amido amine or a di- or tri-amine.

Kit

Figure 2:
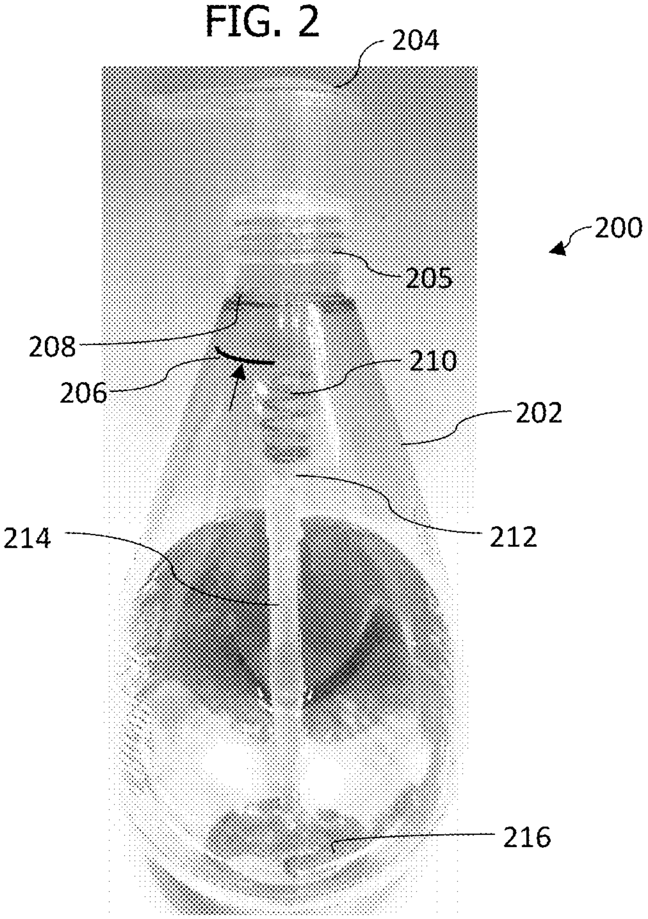
FIG. 2 is a photograph of one embodiment of a liquid cleanser dispenser partially filled with a cleanser.

The water-soluble refill dose articles 100 comprise a concentrated cleanser formulation that when placed in a vessel, such as dispenser 200 of FIG. 2, and combined with water will create a liquid cleanser.

Cleanser kits include a dispenser that discharges a liquid cleanser upon activation by a user (without foaming the cleanser) and a water-soluble refill dose article as described above. Referring to FIG. 2, a dispenser 200 has a container 202 defining a preselected cleanser volume, as noted by the fill line 206, and a pump 204 that is removably and sealably engaging a mouth 208 of the container, for example, by a threaded neck 205. The pump 204 includes a spring 210 seated inside a larger diameter tube 212 and a smaller diameter tube 214 inserted in the larger diameter tube and extending to an interior bottom 216 of the container 202. The water-soluble refill dose article 100 is dissolvable in water to form a liquid cleanser having the preselected cleanser volume of the container and having a viscosity within the ranges disclosed above. And, after water is added to the container 202 to the fill line 206, the water-soluble refill dose article dissolves to form a liquid cleanser within the dispenser 200. Gentle swishing by the user will aid in the mixing and dissolving of the water-soluble refill dose article.

The pump 204 of the dispenser is a hand-actuatable pump, but may include a sensor for automatic dispensing of the cleanser. The fill line 206 identifies a preselected cleanser volume for the container 202. The size and shape of the dispenser can be selected to fit the user's needs.

The kit may have one water-soluble refill dose article disposed inside the container of the dispenser, without water present, at the point of sale. The kit may include one or more additional water-soluble refill dose articles accompanying the dispenser. Alternately, the kit may include an empty dispenser and a packet containing a plurality of water-soluble refill dose articles.

The water-soluble refill dose article is sized and shaped to be smaller than the mouth 208 of the container 202. In one embodiment, the water-soluble refill dose article is generally cylindrically shaped and has a diameter less than 5 cm, more preferably less than 3 cm.

Working Examples

TABLE 1

Example 1 - Concentrated Cleanser Composition with Mulitple Alkaline Substances

| Ingredient Category | Name | wt/wt % |
|---|---|---|
| Rheology Modifier | CARBOPOL ® Ultrez 20 Polymer | 5.7 |
| Rheology Modifier | Hydroxypropyl methylcellulose | 1 |
| First Alkaline Substance | PEG-15 cocamine. | 18 |
| Second Alkaline Substance | Cocamidopropyl dimethylamine | 11 |
| Alkaline Substance | Arginine | 4.5 |
| Amphoteric Surfactant | Cocamidopropyl hydroxysultaine | 18 |
| Anionic Surfactant | Laureth-5 carboxylic Acid | 16.5 |
| Anionic Surfactant | Sodium cocoyl glutamate | 8.3 |
| Preservative | Phenoxyethanol | 11 |
| Fragrance | Fragrance | 5.5 |
| Colorant | Colorant | 0.5 |
| | TOTAL | 100.00 |

Table 1 is an example of a concentrated cleanser composition present in a single chamber water-soluble film refill dose article. At ambient temperature (room temperature being typically 25° C.), in a main vessel the phenoxyethanol and fragrances were mixed until uniform. Then, any anhydrous surfactants present were added thereto with mixing, such as sodium cocoyl glutamate. Next, the rheology modifiers, CARBOPOL® Ultrez 20 polymer and hydroxypropyl methylcellulose, were added to the main vessel with mixing. Then, the first alkaline substance, PEG-15 cocamine, was added with mixing. Next, the second alkaline substances, arginine and cocamidopropyl dimethylamine, and any remaining surfactants were added with mixing. Lastly, the colorant and any benefit agents, which are mixed with a reserved amount of surfactant, were added with mixing until a uniform solution is formed.

The ratio of the sum of the rheology modifiers to the first alkaline substance to the second alkaline substance is about 1:2.7-3.4:1.6 based on the percent weight values. In this example, the concentration of the first alkaline substance is at least equal to the concentration of the rheology modifiers, collectively, and is greater than the concentration of the second alkaline sub stance.

TABLE 2

Example 2 - Concentrated Cleanser Composition with a Single Alkaline Substance

| Ingredient Category | Name | wt/wt % |
|---|---|---|
| Rheology Modifier | CARBOPOL ® Ultrez 20 Polymer | 6 |
| First Alkaline Substance | PEG-15 cocamine. | 15 |
| Anionic Surfactant | Sodium lauroyl lactylate | 20 |
| Anionic Surfactant | Sodium lauroyl isethionate | 10 |
| Anionic Surfactant | Sodium C14-18 Olefin Sulfonate | 7 |

TABLE 2-continued

| Example 2 - Concentrated Cleanser Composition with a Single Alkaline Substance | | |
|---|---|---|
| Ingredient Category | Name | wt/wt % |
| Non-Ionic Surfactant | Polysorbate-20 | 6 |
| Non-Ionic Surfactant | Polyglyceryl-3 Lactate/Laurate | 5 |
| Non-Ionic Surfactant | Polyglyceryl-2-Caprate | 5 |
| Additive | Polyglycerin-3 | 5 |
| Additive | Propylene Glycol | 4 |
| Preservative | Phenoxyethanol | 11 |
| Fragrance | Fragrance | 5.5 |
| Colorant | Colorant | 0.5 |
| | TOTAL | 100.00 |

Table 2 is another example of a concentrated cleanser composition present in a single chamber water-soluble film refill dose article. In a main vessel, a majority of the concentration of one or two of the surfactants was added with mixing. The surfactants used at this stage must be anhydrous. In this case, heat was used to melt the surfactant, sodium lauroyl lactylate. Next, the first alkaline substance, PEG-15 cocamine, was added with mixing and the rheology modifier, CARBOPOL® Ultrez 20 polymer, was added to the main vessel with mixing. Next, at ambient temperature (room temperature being typically 25° C.), in the main vessel the phenoxyethanol and fragrances were mixed until uniform and the remaining surfactants, the benefit agents, and colorants were added with mixing until a uniform mixture was formed.

In this case, the single alkaline substance will be added to the composition as one portion, the total of which is a stabilizing amount and a viscosity increasing amount. The stabilizing amount is at least equal to the weight percentage of the rheology modifier. In one embodiment, the stabilizing amount is in a range of 2-4 times the weight percentage of the rheology modifier(s).

TABLE 3

| Concentrated Cleanser Compositions with Dual Alkaline Substances | | | | |
|---|---|---|---|---|
| Ingredient Category | Name | Example 3 % (w/w) | Example 4 % (w/w) | Example 5 % (w/w) |
| Surfactant blend | Polyglycerl-2-Caprate, Propylene Glycol, Disodium Coco-Glucoside Citrate, Sodium Lauroyl Sarcosinate, Water | 24.6 | 10.0 | 10.0 |
| Rheology Modifier | CARBOPOL ® Ultrez 20 | 6.1 | 6.1 | 6.1 |
| Additive | Shebu Oil | 0.2 | 0.2 | 0.2 |
| Preservative | Phenoxyethanol | 11.0 | 11.0 | 11.0 |
| Non-Ionic Surfactant | Polysorbate 20 | 10.0 | 11.0 | 11.0 |
| Fragrance | Fragrance | 5.5 | 5.5 | 5.5 |
| Additive | Olivoil Avenate | 0.1 | 0.1 | 0.1 |
| Non-Ionic Surfactant | Sodium Laureth Sulfate (70%) | 24.0 | 30.0 | 30.0 |
| First Alkaline Substance | PEG-15 Cocamine | 12.5 | 20.1 | 23.1 |
| Second Alkaline Substance | Cocamidopropyl Dimethylamine | 6.0 | 6.0 | 3.0 |
| | TOTAL | 100.0 | 100.0 | 100.0 |

Referring now to Table 3, three example compositions were made of additional embodiments of the concentrated cleanser in a single chamber water-soluble film refill dose article. At room temperature, in a main vessel the phenoxyethanol, Shebu oil, and fragrances (if present) were mixed until uniform. Then, a majority of the concentration of the surfactant blend was added with mixing. A small amount of the surfactant is reserved as the final addition when coloring is present in the composition. Next, the CARBOPOL® Ultrez 20 polymer was added to the main vessel with mixing. Then, the PEG-15 cocamine was added with mixing. Then, the sodium laureth sulfate and the olivoil avenate surfactant were added, simultaneously or sequentially, with mixing. Last, unless coloring is being added, the cocamidopropyl dimethylamine was added with mixing.

It is important that the PEG-15 cocamine is added to the mixture in these embodiments, containing the CARBOPOL® Ultrez 20 polymer, before the cocamidopropyl dimethylamine is added to prevent the cocamidopropyl dimethylamine from interacting with the CARBOPOL® Ultrez 20 polymer.

Lastly, any colorants mixed with the reserved amount of surfactant can be added with mixing until a uniform solution is formed.

The surfactants in the compositions include a mixture of polyglyceryl-2-caprate, disodium coco-glucoside citrate, sodium lauroyl sarcosinate, polysorbate 20, sodium laureth sulfate, and olivoil avenate surfactant. The rheology modify is CARBOPOL® Ultrex 20. The first alkaline substance is PEG-15 cocamine and the second alkaline substance is cocamidopropyl dimethylamine. The ratio of the rheology modifier to the first alkaline substance to the second alkaline substance are set forth below in Table 4 based on the date from Example 3-5 of Table 3.

TABLE 4

| Ratio: | Rheology modifier | First alkaline substance | Second alkaline substance |
|---|---|---|---|
| Example 3 | 1 | 2 | 1 |
| Example 4 | 1 | 3 | 1 |
| Example 5 | 1 | 7.7 | 1 |

As can be seen from this data, the concentration of the first alkaline substance is at least equivalent to the concentration of the rheology modifier and is greater than the concentration of the second alkaline substance.

A Brookfield DV-II+pro viscometer was used to measure the viscosity in centipoise of Examples 3-5 after dilution in water at a refill dose article:water ratio of 1:10. The viscometer was operated with the following parameters: 6 rpm, 1 minute, and helipath on and the data is provided in Table 5 below.

TABLE 5

| | Viscosity (cps) |
|---|---|
| Example 3 | 17,184 |
| Example 4 | 15,934 |
| Example 5 | 11,560 |

In the compositions of Tables 1, 2 and 3, the percent by weight of water is about 10% or less by wt/wt water. The percent by weight of water may be from multiple sources in the composition, such as the surfactant blend, polysorbate 20, and sodium laureth sulfate.

By encapsulating cleanser as a concentrated, but diluteable formulation in a water-soluble film or pouches, the packaging weight of the product and its size is reduced for reduced shipping and packaging costs. The product can be shipped to any location, placed into a dispenser container, and, upon filling the dispenser with water is dissolved in the water to form a liquid cleanser. Further, the single chamber water-soluble refill dose article's concentrated cleanser composition makes it possible for a rheology modifier (thickener) to be present with a surfactant and its activator, a second alkaline substance, in a single composition without premature thickening.

It should be noted that the embodiments are not limited in their application or use to the details of construction and arrangement of parts and steps illustrated in the drawings and description. Features of the illustrative embodiments, constructions, and variants may be implemented or incorporated in other embodiments, constructions, variants, and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limiting the invention.

Having described the invention in detail and by reference to preferred embodiments thereof, it will be apparent that modifications and variations are possible without departing from the scope of the invention which is defined in the appended claims.

What is claimed is:

1. A water-soluble refill dose article for forming a cleanser comprising:

a water-soluble film defining a single closed internal space in which a liquid concentrated cleanser composition is encapsulated, the liquid concentrated cleanser composition comprises:

a rheology modifier selected from the group consisting of carbohydrate gums, swellable acrylate polymers, cationic guar, cationic modified cellulose, synthetic cationic polymer, high molecular weight polyethylene glycols, superabsorbent polymers, and combinations thereof;

a first surfactant comprising an anionic surfactant 10% wt/wt to 99% wt/wt of the liquid concentrated cleanser composition, the first surfactant being selected from the group consisting of ammonium lauryl sulfate, ammonium laureth sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric monoglyceride sodium sulfate, sodium lauryl sulfate, sodium laureth sulfate, potassium laureth sulfate, sodium lauryl sarcosinate, sodium lauroyl sarcosinate, potassium lauryl sulfate, sodium trideceth sulfate, sodium methyl lauroyl taurate, sodium lauroyl isethionate or methyl isethionate, sodium lauroyl lactylate, sodium laureth sulfosuccinate, sodium lauroyl sulfosuccinate, sodium tridecyl benzene sulfonate, sodium dodecyl benzene sulfonate, sodium olefin sulfonate, sodium decyl sulfate, olivoil avenate, disodium coco-glucoside citrate, ammonium ether sulfate, laureth-5 carboxylic acid, potassium olivoyl hydrolyzed oat protein, sodium cocoyl glutamate, an aliphatic sulfonate, and mixtures thereof;

a first alkaline substance comprising an ethoxylated amine present as a stabilizing amount to prevent the rheology modifier from increasing the viscosity before water dissolves the water-soluble film;

about 10% or less by wt/wt water; and about 20% or less by wt/wt glycol;

wherein the article has an article to water ratio in a range of 1:1 to 1:20 and, upon addition of the article and water of a preselected cleanser volume, a cleanser having a viscosity within a range of 2000 cps to 50,000 cps is formed.

2. The article of claim 1, wherein the rheology modifier is an acrylate/C10-C30 alkyl acrylate crosspolymer or a mixture of acrylate/C10-C30 alkyl acrylate crosspolymer and a carbohydrate gum.

3. The article of claim 1, wherein the first surfactant is selected from the group consisting of sodium laureth-5 carboxylic acid, sodium lauroyl lactylate, sodium C14-C18 olefin sulfonate, sodium lauroyl methyl isethionate, disodium coco-glucoside citrate, sodium lauroyl sarcosinate, sodium cocoyl glutamate, potassium olivoyl hydrolyzed oat protein, and combinations thereof.

4. The article of claim 3, wherein the composition comprises a second surfactant selected from the group consisting of polysorbate 20, polyglyceryl-2 caprate, polyglyceryl-3 lactate/laurate, and combinations thereof.

5. The article of claim 4, wherein one of the first surfactant and the second surfactant is a foaming surfactant.

6. The article of claim 1, wherein the rheology modifier comprises a self-wetting polymer.

7. The article of claim 6, wherein the rheology modifier comprises an acrylate/C10-C30 alkyl acrylate crosspolymer.

8. The article of claim 7, wherein the acrylate/C10-C30 alkyl acrylate crosspolymer is present as about 2% wt/wt to about 10% wt/wt of the liquid concentrated cleanser composition.

9. The article of claim 8, wherein the first alkaline substance comprises polyethylene glycol-15 cocamine.

10. The article of claim 8, wherein a concentration of the first alkaline substance is at least equivalent to the concentration of the rheology modifier.

11. The article of claim 10, wherein a second alkaline substance is present and comprises an amido amine or a di- or tri-amine.

12. The article of claim 1, wherein the concentrated cleanser composition comprises a preservative in a total effective amount for the cleanser volume.

13. The article of claim 1, wherein the concentrated cleanser composition comprises one or more additives selected from the group consisting of coloring, fragrance, emollients, and emulsifiers.

14. A method of mixing a concentrated cleanser that is stored in a single compartment defined by a water-soluble film, the method comprising:

either melting an anhydrous first surfactant by application of heat or mixing the anhydrous first surfactant with at least one other liquid ingredient, the first surfactant being selected from the group consisting of ammonium lauryl sulfate, ammonium laureth sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric monoglyceride sodium sulfate, sodium lauryl sulfate, sodium laureth sulfate, potassium laureth sulfate, sodium lauryl sarcosinate, sodium lauroyl sarcosinate, potassium lauryl sulfate, sodium trideceth sulfate, sodium methyl lauroyl taurate, sodium lauroyl isethionate or methyl isethionate, sodium lauroyl lactylate, sodium laureth sulfosuccinate, sodium lauroyl sulfosuccinate, sodium tridecyl benzene sulfonate, sodium dodecyl benzene sulfonate, sodium olefin sulfonate, sodium decyl sulfate, olivoil avenate, disodium coco-glucoside citrate, ammonium ether sulfate, laureth-5 carboxylic acid, potassium olivoyl hydrolyzed oat protein, sodium cocoyl glutamate, an aliphatic sulfonate, and mixtures thereof;

mixing sequentially into the first surfactant a rheology modifier and a first alkaline substance, in either order to form an intermediate mixture;

wherein the rheology modifier is selected from the group consisting of carbohydrate gums, swellable acrylate polymers, cationic guar, cationic modified cellulose, synthetic cationic polymer, high molecular weight polyethylene glycols, superabsorbent polymers, and combinations thereof, and the first alkaline substance comprises an ethoxylated amine present as a stabilizing amount to prevent the rheology modifier from increasing the viscosity of the composition until diluted with water; and mixing remaining ingredients into the intermediate mixture to form a concentrated cleanser composition that when diluted with water to form a cleanser volume will result in a cleanser with a viscosity within a range of 2000 cps to 50,000 cps.

15. The method of claim 14, wherein the remaining ingredients includes one or more of an additional surfactant, a preservative, a fragrance, a benefit agent, and a colorant.

16. The method of claim 14, wherein the first alkaline substance comprises collectively a stabilizing amount and a viscosity increasing amount thereof.

17. The method of claim 16, wherein mixing sequentially comprises mixing the first alkaline substance before mixing the rheology modifier.

18. The method of claim 16, wherein mixing sequentially comprises mixing the rheology modifier before mixing the first alkaline substance, and the first alkaline substance is present in a stabilizing amount; and comprising mixing in a second alkaline substance that is different from the first alkaline substance subsequent to mixing in the first alkaline substance, wherein the second alkaline substance is present as a viscosity increasing amount.

19. The method of claim 14, wherein the first alkaline substance comprises polyethylene glycol-15 cocamine in a concentration at least equivalent to the concentration of the rheology modifier.

* * * * *